United States Patent [19]

Johanson

[11] Patent Number: 5,019,129
[45] Date of Patent: May 28, 1991

[54] WORKPIECE HOLDING SYSTEM

[76] Inventor: Lars Johanson, 72 Hillsdale Rd., Cedar Grove, N.J. 07009

[21] Appl. No.: 553,751

[22] Filed: Jul. 18, 1990

[51] Int. Cl.$^5$ ............................................... B23Q 3/02
[52] U.S. Cl. ..................................... 269/71; 269/136; 269/244; 269/82
[58] Field of Search ..................... 269/73, 71, 134–138, 269/247, 244, 250–253, 282, 82, 285–286

[56] References Cited

U.S. PATENT DOCUMENTS

| | | | |
|---|---|---|---|
| 3,514,092 | 5/1970 | Lassy | 269/134 |
| 4,422,629 | 12/1983 | Carlson | 269/282 |
| 4,577,846 | 3/1986 | Buchler | 269/82 |
| 4,667,415 | 5/1987 | Barsky | 269/73 |
| 4,925,168 | 5/1990 | Ramsbro | 269/136 |

FOREIGN PATENT DOCUMENTS

| | | | |
|---|---|---|---|
| 149429 | 7/1985 | European Pat. Off. | 269/73 |
| 2224247 | 10/1974 | France | 269/134 |

Primary Examiner—Robert C. Watson
Attorney, Agent, or Firm—Fleit, Jacobson, Cohn, Price, Holman & Stern

[57] ABSTRACT

A workpiece holding system utilizing an improved vise having jaws that remain parallel with the workpiece and introduce a downward force on the workpiece to retain it against a precision supporting surface with the system of this invention primarily intended for use in holding workpieces on EDM wire machines. Each jaw has a step at the bottom which is significant when used on a wire EDM machine as it provides the ability to "pick up" the location of the workpiece from four sides. The system includes a dovetail incorporated into the vise with the position of the dovetail being the same regardless of the size of the vise thereby making it possible to use two different vises in a vertical setup to hold elongated workpieces accurately and making it easy to change from one vise to another. A single adjustment block can be used for a number of vises thus reducing the overall cost of the system. The jaws are inclined towards the top providing the ability to spring under pressure to force the workpiece downwardly but once the jaws are parallel with the workpiece, they will not bend any further even under increased pressure thereby holding the workpiece more firmly and accurately. A vertical dovetail adapter has been provided to support more than one vise of different size or the same size and an adjustment block has been provided which has a male dovetail for quick attachment of vises, vertical dovetail adapters and the like.

9 Claims, 3 Drawing Sheets

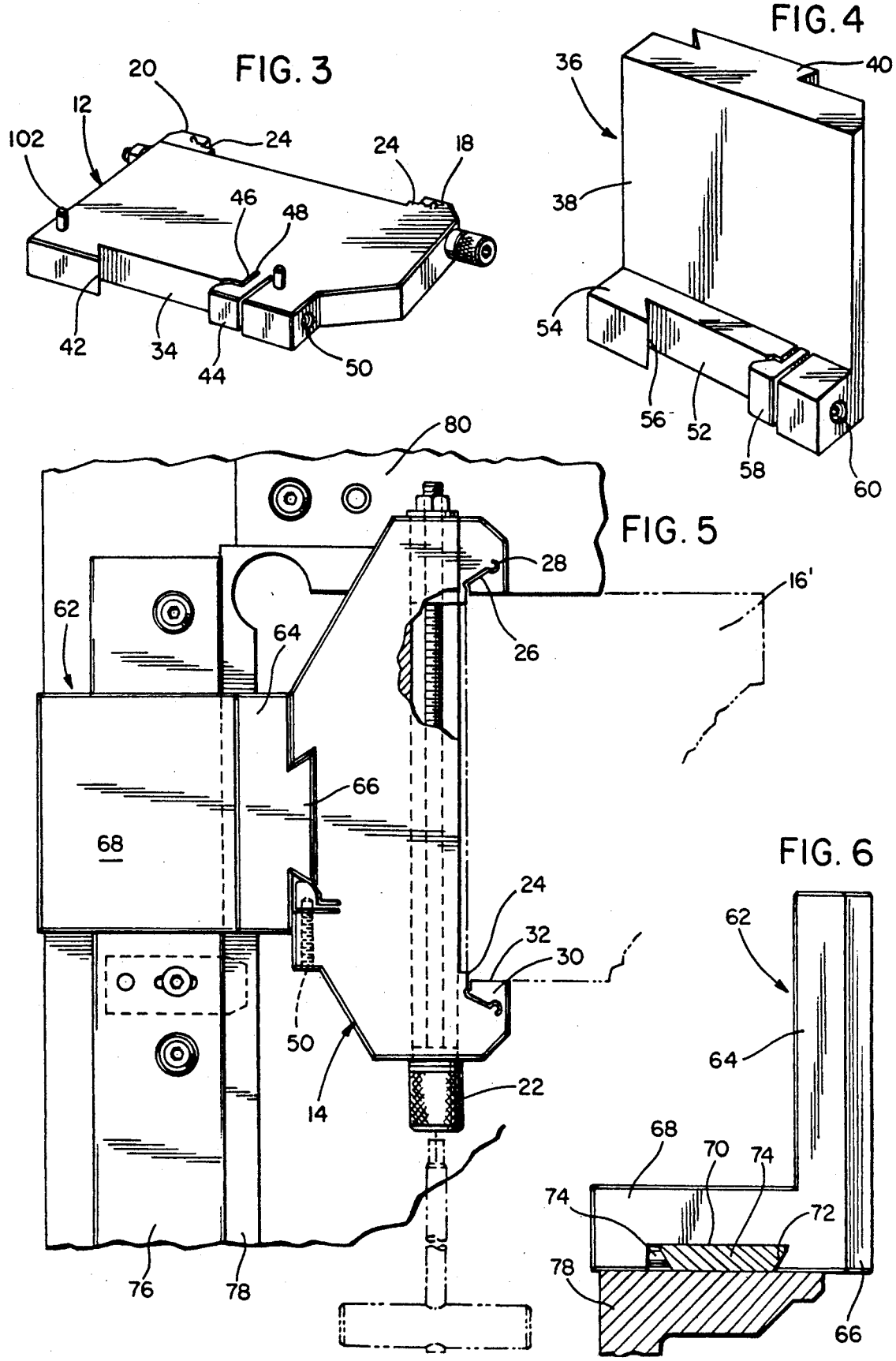

WORKPIECE HOLDING SYSTEM

BACKGROUND OF THE INVENTION

1. Field of the Invention

The present invention generally relates to a workpiece holding system utilizing an improved vise having jaws that remain parallel with the workpiece and introduce a downward force on the workpiece to retain it against a precision supporting surface with the system of this invention primarily intended for use in holding workpieces on EDM wire machines. Each jaw has a step at the bottom which is significant when used on a wire EDM machine as it provides the ability to "pick up" the location of the workpiece from four sides. The system includes a dovetail incorporated into the vise with the position of the dovetail being the same regardless of the size of the vise thereby making it possible to use two different vises in a vertical setup to hold elongated workpieces accurately and making it easy to change from one vise to another. A single adjustment block can be used for a number of vises thus reducing the overall cost of the system. The jaws are inclined towards the top providing the ability to spring under pressure to force the workpiece downwardly but once the jaws are parallel with the workpiece, they will not bend any further even under increased pressure thereby holding the workpiece more firmly and accurately. A vertical dovetail adapter has been provided to support more than one vise of different size or the same size and an adjustment block has been provided which has a male dovetail for quick attachment of vises, vertical dovetail adapters and the like.

2. Description of the Prior Art

Various efforts have been made to accurately support workpieces when work operations are being performed on the workpieces. Such devices include clamps or vises adjustably supported on a table or other support structure and which include at least one movable jaw to grip the workpiece. The relatively movable jaws are provided with structural features which convert a portion of the clamping force to a downward force exerted on the workpiece to move the workpiece downwardly into firm contacting relation to a precision bottom surface thereby accurately and firmly supporting the workpiece in desired location. The following patents relate to this field of endeavor:

| | |
|---|---|
| 1,454,993 | 3,514,092 |
| 2,373,384 | 3,791,640 |
| 2,806,411 | 4,240,621 |
| 2,861,492 | 4,411,415 |
| 3,089,708 | 4,518,155 |
| 3,232,602 | European Pat. 0 052 379 |
| 3,416,784 | |

While the above patents include structures for exerting downward force on the workpiece when the workpiece is clamped by the opposing jaws of a vise, none of them disclose the specific structure of the jaws used on the vise of the present invention and none of them disclose the overall system of this invention including the dovetail arrangements, the vertical adapter, adjustment block and related components.

SUMMARY OF THE INVENTION

An object of the invention is to provide a workpiece holding system utilizing vises of different sizes having a unique jaw arrangement which will impart downward force to a workpiece when the workpiece is clamped to hold the workpiece firmly against a precision supporting surface with the jaws being initially tapered or inclined upwardly and constructed to enable bending of the jaws to a position parallel to the workpiece surfaces with the jaws remaining parallel regardless of the inward pressure exerted by the vise.

Another object of the invention is to provide a workpiece holding system in which the vises include a dovetail recess in a surface thereof opposite the clamping jaws with the dovetail being located in the same location regardless of the size of the vise in order for vises of different sizes to be utilized in a vertical set up to hold tall or elongated workpieces in an accurate manner.

A further object of the invention is to provide a workpiece holding system in accordance with the preceding objects together with a vertical dovetail adapter which has a dovetail the same size as the dovetail in the vises to support vertically spaced vises with the adapter having a horizontal female dovetail to engage a male dovetail on an adjustment block. The vertical dovetail of the adapter is male and engages the female dovetail on the vises to enable more than one vise of the same or different size to be secured to the adapter for holding long workpieces.

Still another object of the invention is to provide an adjustment block which has a male dovetail for attaching various vises, vertical dovetails and the like with the dovetails being adjusted sideways by a cam and held in place by Schnorr type springs to enable light workpieces to be held without the need to lock the dovetail.

A still further object of the invention is to provide a workpiece holding system in accordance with the preceding objects in which the adjustment block can be provided with an indicator to indicate when the block is parallel which will speed up the adjustment process since this will provide a starting point when first setting up the workpiece.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a perspective view of a vise.

FIG. 4 is a perspective view of the vertical dovetail adapter.

FIG. 5 is a top plan view similar to FIG. 1 but illustrating a different set up.

FIG. 6 is a side elevational view of the adjustment block.

DESCRIPTION OF THE PREFERRED EMBODIMENTS

Figure 1:
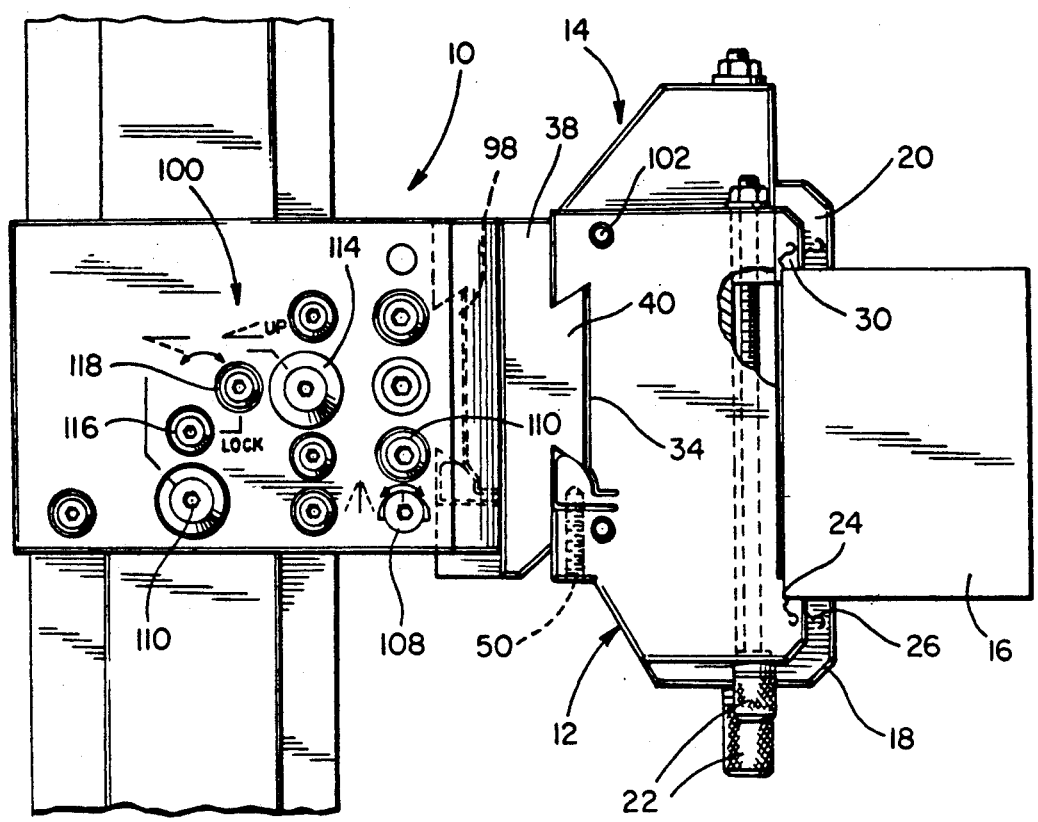
FIG. 1 is top plan view of the workpiece holding system of the present invention.
Figure 2:
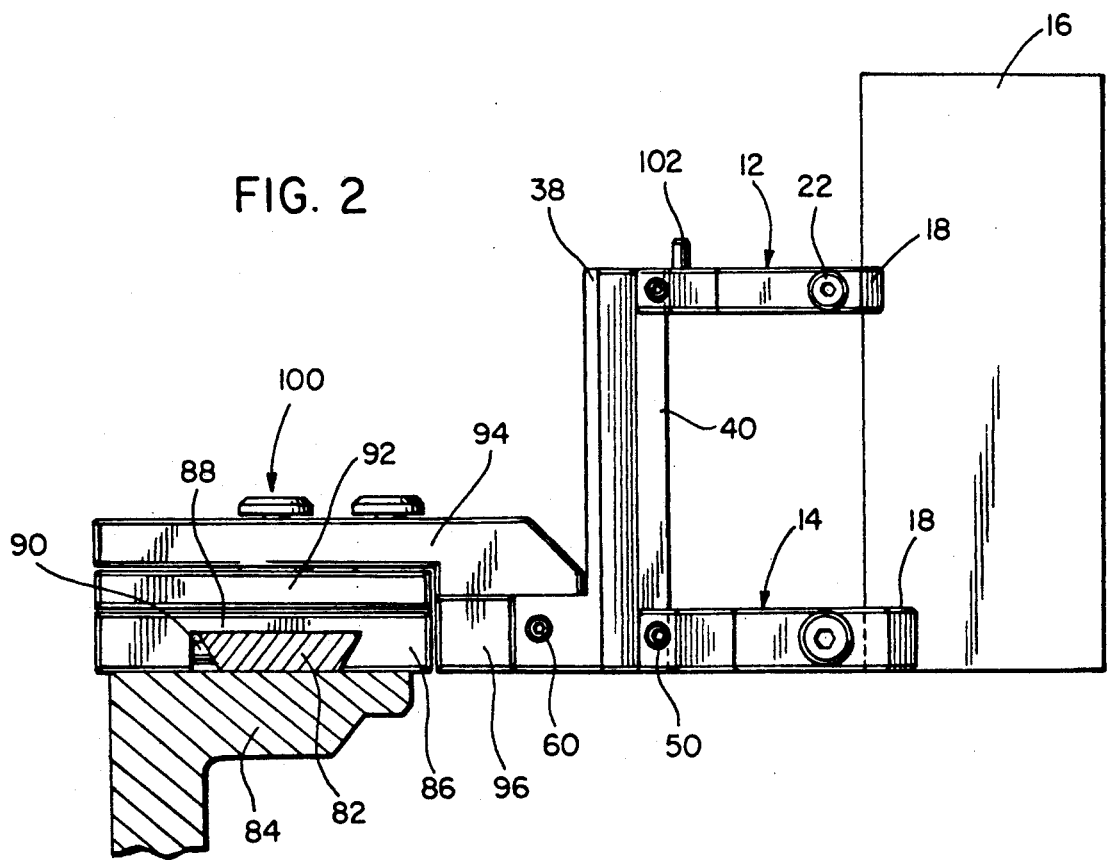
FIG. 2 is a side elevational view of the structure illustrated in FIG. 1.

Referring specifically to FIGS. 1 and 2, the workpiece holding system of the present invention is generally designated by reference numeral 10 and includes a pair of vises generally designated by reference numerals 12 and 14 for accurately and firmly supporting a workpiece 16. The structural details of one of the vises is illustrated in FIG. 3 and includes a stationary jaw 18 and a movable jaw 20 which is actuated by a clamp screw assembly 22 of conventional construction. Each of the jaws 18 and 20 includes a step 24 at their bottom area to receive and engage the workpiece 16 as illustrated in FIG. 1. Also, each of the jaws includes a groove or slot 26 which extends outwardly from the corner of the step 24 in an inclined direction and terminating in a curved end portion 28 which provides each of the jaws with a workpiece engaging portion 30 capable of bending when clamping force is exerted by the jaws. Each of the jaws includes a workpiece engaging surface 32 on the workpiece engaging member 30 with the surfaces 32 normally diverging outwardly or tapering outwardly when no clamping pressure is exerted against a workpiece. When clamping pressure is exerted onto the workpiece 16, the jaws 30 will bend about an axis generally defined by the outer curved end 28 of the slot or groove 26 and the surfaces 32 will become parallel to the surfaces of the workpiece when the portion 30 of the jaws bends downwardly and inwardly to close the slot or groove 26. Once the surfaces 32 become parallel with the surfaces of the workpiece, no additional flexing of the workpiece engaging portion of the jaws will occur with further tightening of the screw assembly 22 providing a positive and secure clamping engagement with the workpiece.

As illustrated in FIGS. 1 and 2, the two vises 12 may be of different sizes with the relationship of the jaws being offset as illustrated in FIG. 2 which enables different sizes of vises to be utilized to hold a particular workpiece 16.

Each of the jaws 12 and 14 has a dovetail recess 34 in the edge thereof opposite the jaws 18 and 20 with the orientation, size and location of the dovetail recesses 34 being the same regardless of the size of the vise thus enabling different size vises 12 and 14 to be supported on a vertical dovetail adapter generally designated by reference numeral 36 and which includes a vertical plate 38 having a male dovetail 40 on the outer surface thereof which is engaged by the female dovetail recess 50 34 in the vises 12 and 14 thereby enabling a single vise or multiple vises to be supported on the adapter 36 by mounting on the vertical male dovetail 40.

The dovetail recess 34 includes a stationary inwardly inclined dovetail surface 42 and a bendable jaw 44 defined by an angular slot 46 and a straight slot 48. A clamp screw assembly 50 extends inwardly from the outer surface of the vise and engages the surface of the jaw 44 defined by the slot 48 to clamp the vise to the male dovetail 40 on the vertical dovetail adapter 36 thereby vertically adjustably supporting the vises 12 or 14 on the adapter which enables multiple vises to be used or a single vise to be used and vises of different sizes oriented at different vertical positions in relation to each other to secure vertically elongated workpieces 16. The lower end of the vertical dovetail adapter 36 includes a female dovetail recess 52 on a projecting plate 54 that projects oppositely from the male dovetail 40 with the recess 52 including a stationary jaw 56 and a bendable jaw 58 similar to the jaw 44 on the vise 12 and being bendable by the same type of screw assembly 60.

FIGS. 5 and 6 illustrate an adjustment block 62 including a vertical plate 64 having a male dovetail 66 on the outer surface thereof in a manner similar to the adapter 36 illustrated in FIG. 4. The lower end of the adjustment block includes a horizontally extending plate 68 perpendicular to the plate 64 which includes a downwardly facing dovetail recess 70 having a stationary jaw 72 inclined at one edge thereof and a clamp member 74 at the other edge thereof for adjustably mounting the block 62 on a male dovetail 76 on a supporting table 78 or other supporting structure. As illustrated in FIG. 5, a single or multiple vise such as a larger vise 14 can be supported adjustably on the adjustment block 62 and the adjustment block 62 can be moved longitudinally on the dovetail recess 76 and locked in place with the larger vise 14 adapted to support a larger workpiece 16'. A similar table structure 80 to the table structure 78 and can serve to position the larger workpiece 16'.

FIGS. 1 and 2 illustrate a mounting for the vertical dovetail adapter 36 to support it from a male dovetail 82 on a supporting table 84 or the like with a mounting plate 86 having a female dovetail recess 88 on the undersurface thereof adjustably mounted on the male dovetail 82 by a clamp structure 90. The mounting plate 86 includes support plates 92 and 94 thereon with the plate 94 including a projection 96 having a male dovetail 98 thereon received in the female dovetail recess 52 and the adapter 36 with the plate 94 including adjustment and locking structures generally designated by reference numeral 100 which can vary the position of the adapter both vertically and horizontally.

Figure 7:
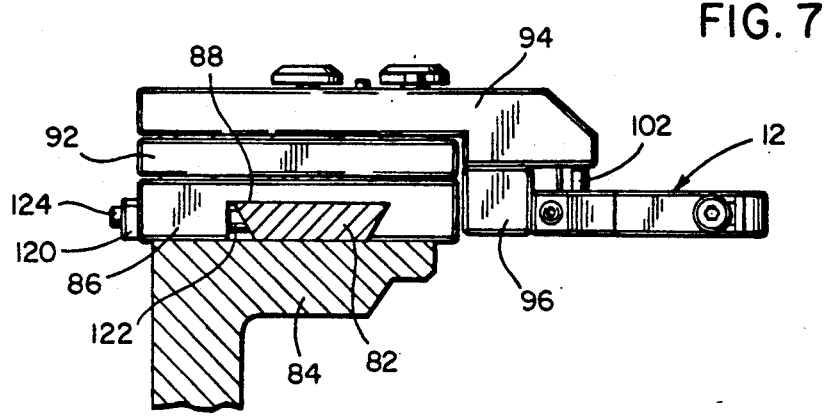
FIG. 7 is a side elevational view of another arrangement workpiece holding components.
Figure 8:
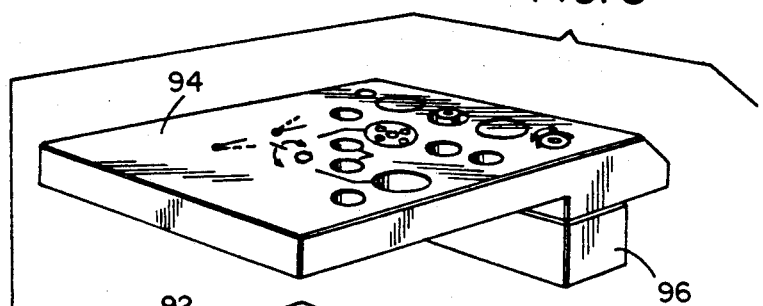
FIG. 8 is an exploded perspective view of the supporting adjusting structure for a vise.

FIGS. 7 and 8 illustrate the details of the adjustment structure 100 and associated plates 86-98 mounted on the dovetail 82 on supporting table 84 with a clamp vise 12 mounted on male dovetail 98 with pins 102 spacing the vise 12 downwardly from the edge of plate 94. The pins 102 vary in length depending on the thickness of the vise 12 to position the lower surface of the vise 12 flush with the lower surface of the projection 96 and male dovetail 98.

The adjustment structure includes recessed cylindrical bearings 104 arranged in recesses 106 in the upper surfaces of plates 86 and 92 with the bearings 104 being disposed adjacent one edge of the plates with the bearings in plate 88 being perpendicular the bearings 104 in plate 92. Also, the angular position of plate 94 can be adjusted by cam device 108 when lock 110 is released. The vertical adjustment of plate 94 can be adjusted at 112 and 114 when locks 116 and 188 are released. The plate 86 is frictionally locked to dovetail 82 by an adjustable Schnorr spring assembly 120 in the outer side thereof as shown in FIG. 7 and which includes spring biased pins 122 engaging the dovetail 82. This structure can be locked to dovetail 82 by locking screw 124.

Figure 9:
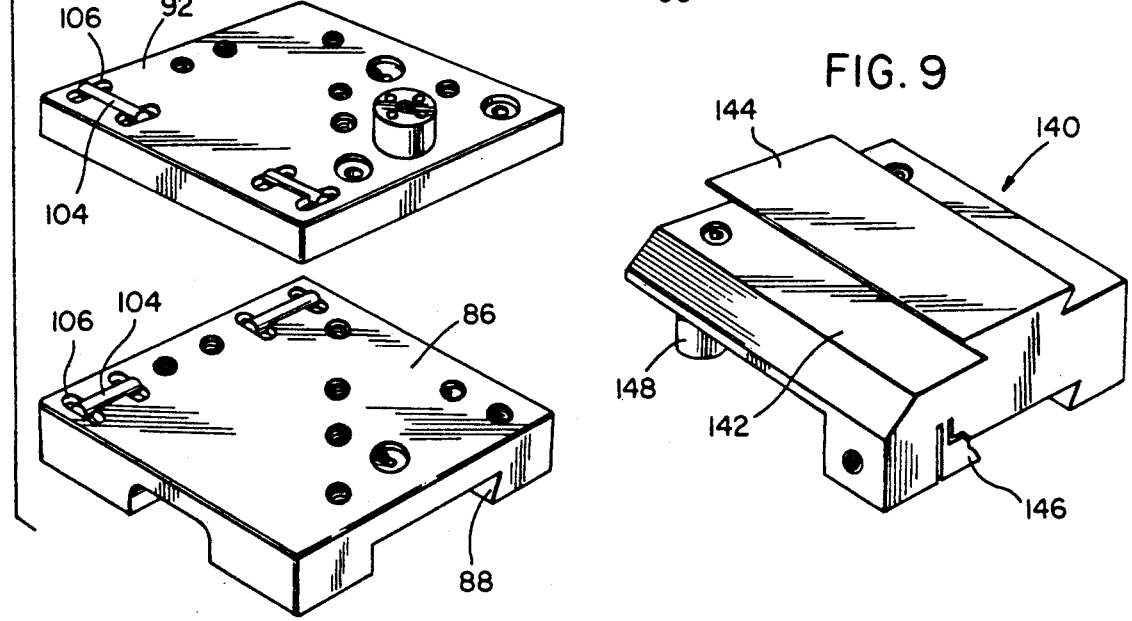
FIG. 9 is a perspective view of another adaptor.

FIG. 9 illustrates another embodiment for supporting adaptor 140 which includes a plate 142 having a dovetail projection 144 along one curface thereof which may be the upper surface and a clamp vise 146 along an opposite surface which may be the bottom surface. The plate 142 includes legs or spaces 148 on the surface thereof which has the clamp vise 146 thereon. This adaptor enables support of one or more clamp vises 12 or 14 perpendicular to the projection 144 and plate 142 as well as a mounting dovetail member engaged by the vise 146.

The jaw gripping surfaces 32 diverge outwardly at a relatively small degree when they are not exerting clamping pressure on the workpiece. As clamping pressure is applied, the jaw gripping surfaces 32 move to a parallel relation to the workpiece and are stopped by the grooved surfaces contacting each other. This provides a downward or inward force exerted on the workpiece to retain the workpiece securely against the precision step surfaces in the jaws thereby providing a firm and rigid but yet precise support for the workpiece. The construction of the vises and the dovetail adapter and adjustment block with male and female dovetails of the same size and location enables a single or multiple vises of the same or different sizes to be adjustably supported for optimum supporting engagement with the workpiece. Each of the screw threaded clamp devices includes a recess for receiving the hexagonal output of a torque wrench as illustrated in broken line in FIG. 5. The dimensional characteristics of the jaws may vary depending upon the job requirements and the system of this invention enables the ability to accomplish "pick up" the location of the workpiece from four sides when used on a wire EDM machine. The versatility of uses is greatly enhanced by the dovetail connecting and adjustment assemblies associated with various types of vises and various types of supporting structures thereby enhancing the workpiece holding capabilities while maintaining the costs at a minimum.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A workpiece holding system comprising a vise including a stationary jaw and a movable jaw with screw threaded means interconnecting the jaws to move them together, each of said jaws having a step adjacent its inner edge to provide a workpiece support surface, each of said jaws including a bendable workpiece engaging portion having a workpiece engaging surface thereon and being bendable about a point adjacent an outer edge portion whereby the workpiece gripping surfaces will move toward the steps on the jaws when clamping force is exerted by the jaws to bend the workpiece engaging portions, said workpiece engaging surfaces diverging outwardly and being bent to a position with the workpiece engaging surfaces parallel to the workpiece with the workpiece engaging surfaces not moving beyond a parallel relationship with the workpiece to provide a positive gripping action to the workpiece.

2. The workpiece holding system as defined in claim 1 wherein said vise includes a plate-like body having a female dovetail recess in the edge thereof opposite the jaws, said dovetail recess including a stationary inclined wall and a bendable clamp member with a clamp screw engaging the bendable clamp member, and support means for the vise including a male dovetail received in the female dovetail recess in the vise body, said clamp screw moving the bendable clamp member to clamp the vise to said male dovetail on the support means.

3. The workpiece holding system as defined in claim 2 wherein said support means for the vise includes a vertically elongated adapter having a male dovetail on the surface thereof extending vertically to receive the dovetail recess on a vise or vises, said adapter including a horizontal plate at the bottom edge thereof and having a female dovetail recess facing opposite from the male dovetail and in parallel relation thereto for engagement with a support having a male dovetail thereon, said female dovetail recess on said horizontal plate including a stationary inclined wall and a bendable clamp member having an inclined wall in opposed relation to the stationary inclined wall and a clamp screw engaging the bendable clamp member to clamp the adapter to the male dovetail on the support.

4. The workpiece holding system as defined in claim 3, wherein said support includes a vertically elongated adjustment block having said male dovetail thereon and a horizontal plate at the lower end of the block and having a downwardly facing female dovetail recess therein engaging a male dovetail on a support table, said downwardly facing dovetail recess including a stationary inclined wall and an opposed clamp member for adjustable interconnecting the support and support table.

5. The workpiece holding system as defined in claim 2 wherein said support means for the vise includes a vertically elongated adjustment block having a vertically elongated male dovetail along one vertical surface thereof, a horizontal plate projecting laterally from said block at the lower end thereof in opposed relation to the male dovetail, said horizontal plate including a downwardly facing female dovetail recess in the bottom surface thereof including a stationary inclined wall and a clamp member opposed thereto, and a support table having a male dovetail recess on the upper surface thereof clampingly engaged in the female dovetail recess in the bottom surface of the horizontal plate thereby supporting the block and vise from the support table.

6. The workpiece holder as defined in claim 2 wherein said support means for the vise includes a mounting plate positioned horizontally and including a male dovetail adjacent one edge thereof, mounting means connected to said mounting plate and including a downwardly facing female dovetail recess in the lower surface thereof including a stationary inclined wall and an opposed clamp member, a support table having a male dovetail on the upper surface thereof clampingly received in the female dovetail recess in the mounting means, said mounting plate including a projecting edge portion above said male dovetail, said vise body including projecting pins on the upper surface thereof to engage the projecting edge portion to space the vise accurately in relation to the mounting plate thereby enabling vise bodies of different thickness and different length pins to be equally spaced from the projecting edge portion on the mounting plate.

7. The workpiece holding system as defined in claim 6 including adjustment means between the mounting plate and the mounting means, said mounting means including two plates underlying the mounting plate and adjustment means and bearing means interconnecting the mounting plate and the plates forming the mounting means for adjustment of the mounting plate and vise in relation to the support table.

8. The workpiece holding system as defined in claim 2 wherein said support means for the vise includes an adapter in the form of a horizontally disposed plate having a male dovetail on the upwardly facing surface thereof to receive the dovetail recess on a vise or vises, said plate including a downwardly projecting end portion at one end thereof and including a female dovetail recess therein having a stationary inclined wall and a movable clamp member to clamp the plate to a horizontal male dovetail, the other end of said plate including spacers mounted on the undersurface thereof to support the other end of said plate.

9. The workpiece holding system as defined in claim 3 wherein said support includes a horizontally disposed plate having a projecting, downwardly facing horizontal surface at one edge thereof, the male dovetail on the support being positioned on the plate below the downwardly facing surface and inwardly thereon to engage the female dovetail recess on the horizontal plate of the adapter, mounting means adjustably connected to said horizontal plate, said mounting means including a downwardly facing female dovetail recess, a support table underlying the mounting means and including an upwardly projecting horizontal male dovetail received and clampingly engaged in said female dovetail recess in the mounting means, said mounting means and horizontal plate being adjustably interconnected for positioning the adapter and vise in adjusted relation to a support table.

* * * * *